Patented Nov. 27, 1923.

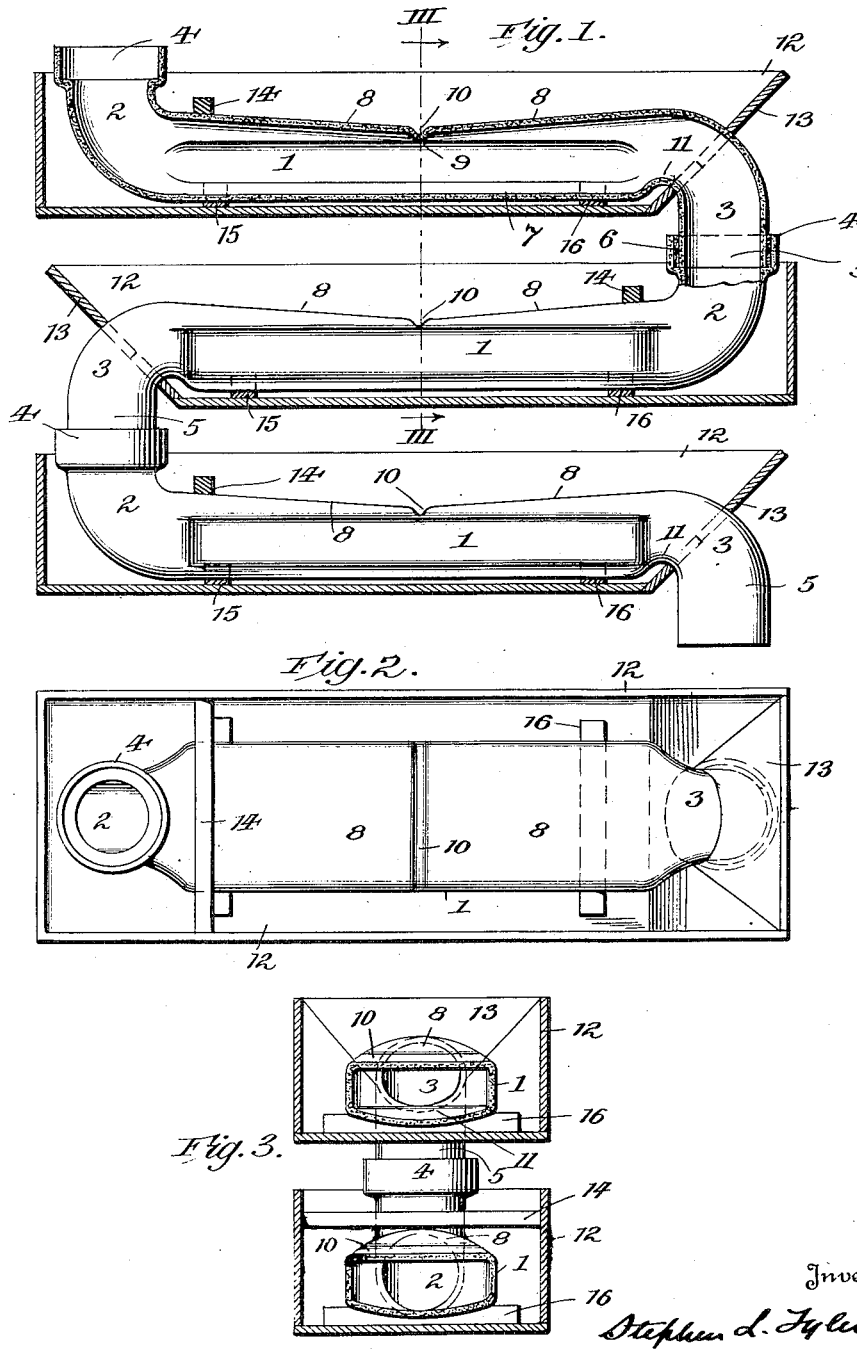

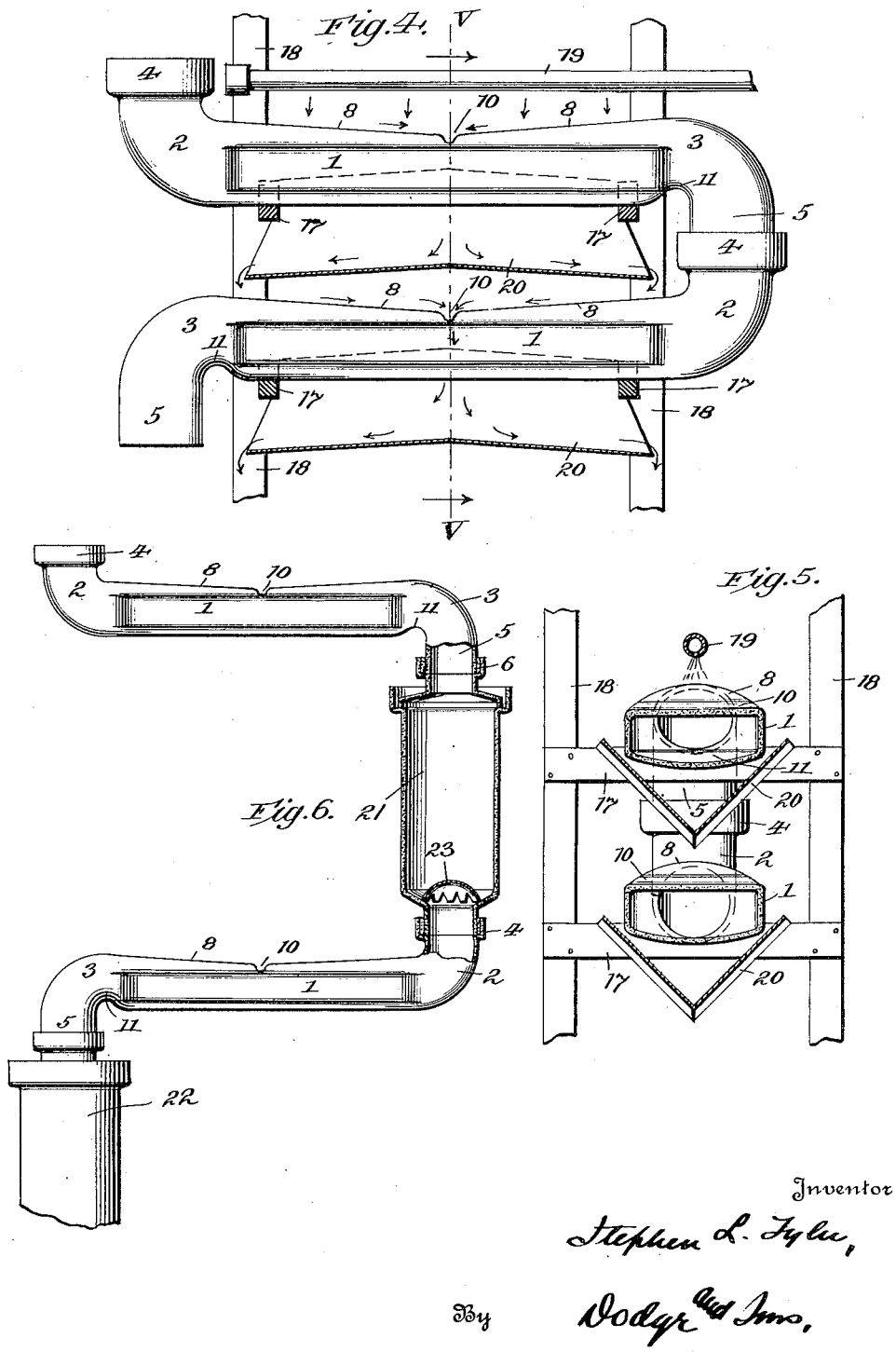

1,475,327

UNITED STATES PATENT OFFICE.

STEPHEN L. TYLER, OF BROOKLYN, NEW YORK.

ABSORPTION AND CONDENSING APPARATUS.

Application filed June 22, 1922. Serial No. 570,132.

*To all whom it may concern:*

Be it known that I, STEPHEN L. TYLER, a citizen of the United States, residing at Brooklyn, in the county of Kings and State of New York, have invented certain new and useful Improvements in Absorption and Condensing Apparatus, of which the following is a specification.

This invention pertains to absorption and condensing apparatus, and is designed more particularly for use in the manufacture of hydrochloric acid, though, of course, it may be employed for absorption purposes generally.

The main object of the invention is to produce units or elements of like form which allow of ready assembly to provide a continuous way or conduit, and which likewise lend themselves to assembly with tower elements, when, for any reason, it is found desirable to employ such towers as part of the conduit or gas way.

A further object is to give the absorption element such form that a maximum exposure of the absorption fluid to the gas is obtained.

A still further object is to so construct the elements that there will be produced therein, when the apparatus is in operation, a curtain of the condensates through which the gas must pass, thereby ensuring a greater absorption than would otherwise obtain. Other advantages will hereinafter appear, and the foregoing statements, while specifying certain objects, are not to be considered as in anywise limiting the scope of the invention.

In the manufacture of hydrochloric acid, it is essential to keep the temperature of the water and gas which is to be absorbed thereby as low as possible, as the degree of absorption is dependent upon the temperature of the water. The present apparatus lends itself particularly to the maintenance of a relatively cool condition, which condition renders the apparatus highly efficient and effective.

Various embodiments and arrangements of the apparatus are disclosed in the annexed drawings, wherein,—

Fig. 1 is a sectional elevation of three interconnected and communicating elements shown as immersed in cooling troughs;

Fig. 2 a top plan view thereof;

Fig. 3 a transverse vertical sectional view on the line III—III of Fig. 1;

Fig. 4 a sectional elevation illustrating an arrangements wherein the various elements are subjected to an external shower of cooling medium;

Fig. 5 a transverse vertical section on the line V—V of Fig. 4; and

Fig. 6 a sectional elevation showing the applicability of the absorption vessels for use in conjunction with tower elements.

Broadly stated, and excluding that arrangement wherein tower elements are employed, the gas absorption conduit may be said to comprise a series of interconnected and communicating chambers which are alike in form and so constructed that they may be readily assembled. Such chambers are produced from acid-resisting material, such for instance as fused silica, acid-proof stone ware, corrosion-resisting alloys, porcelain, or other suitable material.

As the chambers are alike in form, a description of one will suffice, and the various portions or elements thereof are similarly numbered throughout the series.

The chamber may be said to comprise a main body 1, having reversely turned ends 2 and 3, the former terminating in a bell 4 and the latter in a spigot 5. The parts are so proportioned that the bell of one element or chamber will receive the spigot of another, and a tight joint is effected be-between the parts by the use of a suitable acid-proof luting 6. While the up and down turned ends are substantially round in cross section, the body is flattened so that it is wide and shallow. The bottom 7 is preferably slightly curved in cross section, while the top is flattened, inclining downwardly from each end toward the mid-length of the chamber, and merging into a transverse, inwardly projecting rib 9, a gutter 10 being thereby produced upon the outer face of the top. Adjacent the spigot end there is produced a weir or dam 11 which serves to maintain the absorption liquid at a given depth within the chamber.

In Fig. 1 the gas way or conduit is shown as composed of three interconnected chambers, with each chamber supported within a trough 12 adapted to contain a cooling medium such as water. A removable piece, as 13, is provided at one end to facilitate placement and removal of the chamber and a cross sleat 14 overlies the chamber at the opposite end to prevent the same from floating in the cooling medium. Supporting blocks or bars 15 and 16 space the chamber from the bottom of the trough so that the cooling medium entirely surrounds the body of the chamber.

In operation, and assuming that the gas enters the lowermost chamber through its spigot end, and the water enters the uppermost chamber through its bell 4, or, in other words, a counter flow obtains, the gas by reason of the relatively shallow and wide body of the elements, will be spread out over an extended water surface and thereby be brought into intimate contact therewith. Such intimate contact is also enhanced by the downwardly inclined inner face of the top. Moreover, any vapor which may condense upon the inner face of the top 8 will run toward the centrally disposed rib 9 and will drip therefrom, forming, in effect, a liquid curtain through which the oncoming gas must pass. Such liquid curtain tends to absorb more of the gas and carry it down into the water below, such liquid particles entraining more or less gas and causing it to enter the water in the chamber. Furthermore, the dropping of the liquefied vapor causes an agitation of the absorbent which likewise increases the absorptive action. The liquid is also agitated by reason of its passing over the weir or dam of one vessel into that next below, the weirs, however, ensuring the retention of a given depth of liquid in each chamber. It is evident that instead of employing a counterflow of the gas and absorbing liquid, a straight through action might obtain.

In Figs. 4 and 5 a slightly different arrangement of applying the external cooling medium is shown. The flue or conduit is composed of chambers or elements of a construction similar to that above set forth. Said chambers are, however, supported upon transverse bars 17 secured to suitable uprights or columns 18. A shower pipe 19 is located above the uppermost chamber or element of the conduit, the spray water striking the top thereof and flowing in the main toward the centrally disposed gutter 10. Dripping from this gutter, and from the body, it enters an open-ended V-shaped trough 20, the bottom whereof inclines downwardly from the center toward each end, discharging the cooling medium upon the flat top of the underlying chamber adjacent the ends thereof. The medium then flows over said chamber toward the central gutter and passes to the trough next below.

The construction of the chambers permits a ready combination with tower elements, as will be evident upon an inspection of Fig. 6, wherein two chambers 1 are shown as connected to and intercommunicating with short towers 21 and 22. The towers are designed to be packed with any suitable acid resisting material which is sustained therein upon a support 23.

In many cases of absorption of gas in water, it is desirable to use the tower construction as a greater surface is exposed to the gas in a packed tower than in any other form of absorption apparatus. The absorption tower is not, however, especially well adapted to the absorption of hydrochloric acid gas in water because of the high heat of the solution, preventing the production of high strength acid in towers. With the arrangement just mentioned the advantages of the tower absorption are obtained without the disadvantages mentioned, this by reason of the fact that the solution obtained in one tower section is thoroughly cooled in the chamber 1 before passing into the next tower.

It will, of course, be understood that the chambers and interposed towers shown in Fig. 6, may be cooled in any suitable manner.

What is claimed is,—

1. An absorbing chamber comprising a hollow body, said body being provided with an upper wall which inclines downwardly from each end toward the midlength thereof.

2. An absorbing chamber comprising a hollow body, the upper wall or top whereof is flattened and inclines downwardly from each end thereof toward the midlength of the chamber.

3. An absorbing chamber having an inwardly extending rib formed upon the inner face of the top thereof.

4. An absorbing chamber having upon the inner face of the top thereof means for collecting and causing a dropping of the condensates which form upon said face.

5. An absorbing chamber, the top whereof is flattened and inclines downwardly from each end thereof toward a transversely extending gutter formed in the outer surface of said face.

6. An absorbing chamber the top whereof is formed with an external gutter and an internal rib.

7. An absorbing chamber, the top whereof is flattened and inclines from each end toward an external transversely disposed gutter, the bottom of the gutter forming a rib upon the inner face of the top.

8. An absorbing chamber comprising a long, shallow and relatively wide body having a neck at each end, said necks extending in opposite directions with a bell formed at the outer end of one of said necks.

9. An absorbing chamber comprising a long, shallow and relatively wide body, the top or upper wall whereof is flattened.

10. An absorbing chamber comprising a long, shallow and relatively wide body, the top or upper wall whereof is flattened, said wall inclining downwardly from each end toward the center thereof.

11. An absorbing chamber comprising a long, shallow and relatively wide body, the top or upper wall whereof is flattened, said wall inclining downwardly from each end toward a rib extending inwardly from said wall.

12. An absorbing chamber comprising a long, shallow and relatively wide body, the top or upper wall whereof is flattened, said wall inclining downwardly from each end thereof toward a rib extending inwardly from said wall, the ends of said chamber being fashioned, respectively, into oppositely extending necks and one of said necks being provided with a bell.

13. An absorbing chamber comprising a long, shallow and relatively wide body, said chamber being provided with means for directing the gases which pass therethrough into close and intimate contact with the absorbing liquid contained in the body.

14. An absorbing chamber comprising a long, shallow and relatively wide body, said chamber having an upturned neck at one end, a downward neck at its opposite end, and a weir or dam formed adjacent said latter neck.

15. An absorbing chamber comprising a long, shallow and relatively wide body, the upper wall of the body being flattened and inclining downwardly toward a rib extending inwardly from said wall, said body having an upturned neck at one end and a downturned neck at its opposite end, and a dam or weir formed adjacent said downturned neck.

16. In a condenser, the combination of a plurality of intercommunicating chambers arranged in substantial parallelism one above the other, the upper wall of each of which is flattened and inclines downwardly from each end toward the center of the chamber; and a trough located below each chamber, the troughs being open-ended and inclining from the center toward said open ends.

17. In a condenser, the combination of a plurality of intercommunicating chambers arranged in substantial parallelism one above the other, the upper wall of each of which is flattened and inclines downwardly from each end toward the center of the chamber; and a trough located below each chamber, the troughs being V-shaped in cross section, open-ended and inclining from the center toward said open ends.

In testimony whereof I have signed my name to this specification.

STEPHEN L. TYLER.